United States Patent
Kim et al.

(10) Patent No.: US 6,678,433 B2
(45) Date of Patent: Jan. 13, 2004

(54) APPARATUS AND METHOD FOR MEASURING RESIDUAL STRESS AND PHOTOELASTIC EFFECT OF OPTICAL FIBER

(75) Inventors: Jin-Han Kim, Kumi-shi (KR); Sung-Koog Oh, Kumi-shi (KR); Yong-Woo Park, Seoul (KR); Un-Chul Paek, Kwangju-kwangyeok-shi (KR); Dug-Young Kim, Kwangjukwangyok-shi (KR)

(73) Assignee: Samsung Electronics Co. Ltd., Suwon (KR)

( * ) Notice: Subject to any disclaimer, the term of this patent is extended or adjusted under 35 U.S.C. 154(b) by 283 days.

(21) Appl. No.: 09/939,877

(22) Filed: Aug. 27, 2001

(65) Prior Publication Data

US 2002/0126944 A1 Sep. 12, 2002

(30) Foreign Application Priority Data

Jan. 16, 2001 (KR) .......................................... 2001-2366

(51) Int. Cl.⁷ .............................. G02B 6/26; G01P 3/36
(52) U.S. Cl. .............................. 385/15; 385/12; 385/13; 385/33; 385/31; 385/123; 385/11; 356/28; 356/32
(58) Field of Search ............................ 385/12, 13, 14, 385/11, 15, 33, 39, 31, 123; 356/28, 32

(56) References Cited

U.S. PATENT DOCUMENTS

| | | | | |
|---|---|---|---|---|
| 4,564,289 A | * | 1/1986 | Spillman, Jr. ................. 356/33 |
| 4,593,701 A | * | 6/1986 | Kobayashi et al. ......... 600/480 |
| 4,753,507 A | * | 6/1988 | DePaula et al. .............. 385/11 |
| 5,475,489 A | * | 12/1995 | Gottsche ...................... 356/364 |
| 5,627,637 A | * | 5/1997 | Kapteyn ........................ 356/32 |
| 5,864,393 A | | 1/1999 | Maris ............................ 356/28 |
| 6,157,448 A | * | 12/2000 | Kowa et al. ................. 356/365 |

OTHER PUBLICATIONS

Kim et. al., "Apparatus and Method for Measuring Residual Stress . . . ", Pub. No. U.S. 2002/0126944 A1, published Sep. 12, 2002.*

Rose Th Et al. " Fast photoelastic stress determination: application to monomode fibres and splices" Measurement Science & Technology Mar. 4, (1993), No. 3, Bristol, GB, pp. 431–434.

* cited by examiner

Primary Examiner—Brian Healy
(74) Attorney, Agent, or Firm—Cha & Reiter

(57) ABSTRACT

An apparatus and method for measuring residual stress and photoelastic effect of an optical fiber is disclosed. The apparatus includes a rotating light diffuser for providing temporally averaged uniform image by restraining spatial coherence of light emitted from a light source to be completely scattered, a collecting lens for aligning the light passed through the rotating light diffuser in an optical fiber, a linear birefringence device for linearly controlling the polarization state of the aligned light input from the collecting lens, a condenser for condensing the light passed through the linear birefringence device on a place where the optical fiber is located, a fixed polarizer for transforming the polarization state of the light passed through the optical fiber to the intensity distribution by allowing the light emitted from the linear birefringence device to transmit the optical fiber, an objective lens for obtaining a magnified optical fiber image having the intensity distribution of the light transmitted the optical fiber, and a unit for measuring transmittance variation given to the optical fiber depending on locations.

25 Claims, 4 Drawing Sheets

APPARATUS AND METHOD FOR MEASURING RESIDUAL STRESS AND PHOTOELASTIC EFFECT OF OPTICAL FIBER

PRIORITY

This application claims priority to an application entitled "Apparatus and Method for Measuring Residual Stress and Photoelastic Effect of Optical Fiber" filed in the Korean Industrial Property Office on Jan. 16, 2001 and assigned Ser. No. 2001-2366, the contents of which are hereby incorporated by reference.

BACKGROUND OF THE INVENTION

1. Field of the Invention

The present invention relates generally to an apparatus for measuring optical fiber. More particularly, the present invention relates to an apparatus and method for measuring residual stress and the photoelastic effect of an optical fiber.

2. Description of the Related Art

In general, a process for manufacturing an optical fiber includes a process for manufacturing an optical fiber preform and a process for drawing a manufactured optical fiber preform in a strand of optical fiber. Stress occurs in the process for manufacturing optical fiber. The stress may remain in the optical fiber without being removed even after manufacturing the optical fiber. In this case, the stress is called residual stress. It is important to measure the residual stress in view of the manufacture of an optical fiber having high quality, an optical fiber grating, and development and study of a special optical fiber.

The residual stress occurring in a process for drawing an optical fiber at a high temperature increases the loss due to scattering of the optical fiber and causes variation in a refractive index due to a photoelastic effect. Accordingly, to manufacture an optical fiber having high quality, it is necessary to develop the optical fiber manufacturing(drawing) technique that reduces the residual stress. To this end, it is essentially required to develop an equipment that can measure residual stress of an optical fiber.

Furthermore, the periodic removal of some of the residual stress of an optical fiber using a $CO_2$ laser has been recently developed for a long period fiber. Also, there is provided a long period Bragg grating based on UV irradiation. As a means of analyzing the principle of the long period Bragg grating, an apparatus for measuring residual stress distribution is used to prove compaction effect of glass due to UV irradiation.

To study and improve spectral transmission characteristic of the Bragg grating, it is necessary to measure variation effect in a refractive index due to variation of residual stress and the distribution in which the residual stress is periodically removed in a longitudinal direction of the optical fiber.

In addition, it is necessary to deeply study variation in a refractive index due to residual stress, i.e., variation effect of a doping material due to photoelastic effect. To this end, it is necessary to develop an equipment that can three-dimensionally measure and observe residual stress of optical fiber and photoelastic effect.

Residual stress of an optical fiber or optical fiber preform is measured using a photoelastic effect. The photoelastic effect means variation in a refractive index of a medium depending on a direction of stress that remains in the medium. The refractive index of the optical fiber or the optical fiber preform has a variable value depending on a polarized direction of light. When light of two orthogonal polarized components passes through a side vertical to an axis direction of the optical fiber preform or the optical fiber, phase difference of the light occurs depending on the polarized direction of light due to the photoelastic effect by the residual stress. By measuring the phase difference using a polariscope, the range of the residual stress can be identified. Examples of measuring the residual stress of the optical fiber preform and the optical fiber based on the aforementioned conventional method will be supposed in three representative papers as follows.

1. P. L. Chu and T. Whitebread, "Measurement of stresses in optical fiber and preform", Appl. Opt., 1982, 21, pp 4241–4245.

In this paper, a method and theory for optically measuring residual stress of optical fiber using photoelastic effect has been first suggested in detail and residual stress profile of optical fiber and its preform has been measured.

2. Th. Rose, D. Spriegel and J. R. Kropp, "Fast photoelastic stress determination application to monomode fibers and splices," Meas. Sci. Technol. 4, 431–434, (1993).

In this second paper, based on residual stress of a monomode fiber and photoelastic effect used to irradiate stress occurring during fusion splice, an optical measuring apparatus has been developed.

3. K. W. Raine, "A microscope for measuring axial stress profiles in optical fibres with high spatial resolution and low noise," $4_{th}$ optical fibre measurement conference (NPL Teddington UK), 269, (1997).

In this third paper, there has been suggested a method and apparatus for measuring residual stress of optical fiber having high resolution by applying CCD and half-shade method to a measuring method based on the existing photoelastic effect.

To measure residual stress of an optical fiber, residual stress of an optical fiber preform (diameter of 4 cm) having a greater sectional area than the optical fiber is measured so that the residual stress of the optical fiber is analogized. However, since the optical fiber preform has only thermal residual stress, a problem arises in that dynamic residual stress cannot be measured. Accordingly, to measure the dynamic residual stress, the optical fiber should directly be measured under the conditions of high resolution and superaccuracy considering its size (cladding diameter is 120 $\mu$m and core diameter is 8 $\mu$m).

However, the existing measuring method has various technical problems such as relatively smaller phase difference than the optical fiber preform, difficulty in magnifying an image, imaging error due to relative light intensity of image background.

When residual stress of the optical fiber preform is measured, since an optical path of light that passes through the optical fiber preform is long, the phase difference between two orthogonal polarized lights is estimated at 180° or less. However, when residual stress of the optical fiber is measured, the optical path has a length of 1/100 as compared with the optical fiber preform. In the optical fiber, the phase difference of lights is estimated at 2° or less. Accordingly, to measure residual stress of the optical fiber, a measuring apparatus having polarization resolution of a minimum 0.1° is required.

Since a diameter of the optical fiber is 125 $\mu$m, it is necessary to magnify the diameter to form an image. In the existing method of measuring residual stress of the optical fiber preform, it is difficult to closely adhere an objective lens to the optical fiber due to a rotation device of a polarization analyzer and a quarter wave plate on which light that passed through the optical fiber is entered. It is also difficult to raise magnification in technical aspects. Consequently, there results in that a magnified image of the optical fiber is distorted by polarizers. Accordingly, it is necessary to develop a measuring apparatus that minimizes polarized errors and wave plate distortion of light that passed through the optical fiber.

SUMMARY OF THE INVENTION

It is, therefore, an object of the present invention to provide an apparatus and method for measuring residual stress and photoelastic effect of optical fiber, which can minimize wave plate distortion and polarization error of light that passed through the optical fiber.

It is another object of the present invention to provide an apparatus and method for measuring residual stress and photoelastic effect of optical fiber, in which provides a simple structure at low cost.

To achieve the above objects, there is provided an apparatus for measuring residual stress and photoelastic effect of optical fiber including a rotating light diffuser for providing temporally averaged uniform image by restraining spatial coherence of light emitted from a light source to be completely scattered, a collecting lens for aligning the light passed through the rotating light diffuser in an optical fiber, a linear birefringence device for linearly controlling the polarization state of the aligned light input from the collecting lens, a condenser for condensing the light passed through the linear birefringence device on a place where the optical fiber is located, a fixed polarizer for transforming the polarization state of the light passed through the optical fiber to the intensity distribution by allowing the light emitted from the linear birefringence device to transmit the optical fiber, an objective lens for obtaining a magnified optical fiber image having the intensity distribution of the light transmitted the optical fiber, and a unit for measuring transmittance variation given to the optical fiber depending on locations.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

1. Measurement of Residual Stress

Generally, variation in the intensity of light that passes through a side of an optical fiber is measured in such a manner that the polarization state of input beams is obtained by linear birefringence in a state where a polarizer is fixed, unlike the related art method, in which a polarizer is rotated. As an example of such a measuring apparatus, there is a Babinet compensator. The Babinet compensator has a problem in that an incident angle and size of beams are limited by its aperture size. The Babinet compensator also has problems in that it is expensive and cannot be automated. Accordingly, in the present invention, there is provided a simple measuring apparatus that can be automated. The apparatus of the present invention includes a rotating polarizer and a quarter wave plate.

Figure 1:
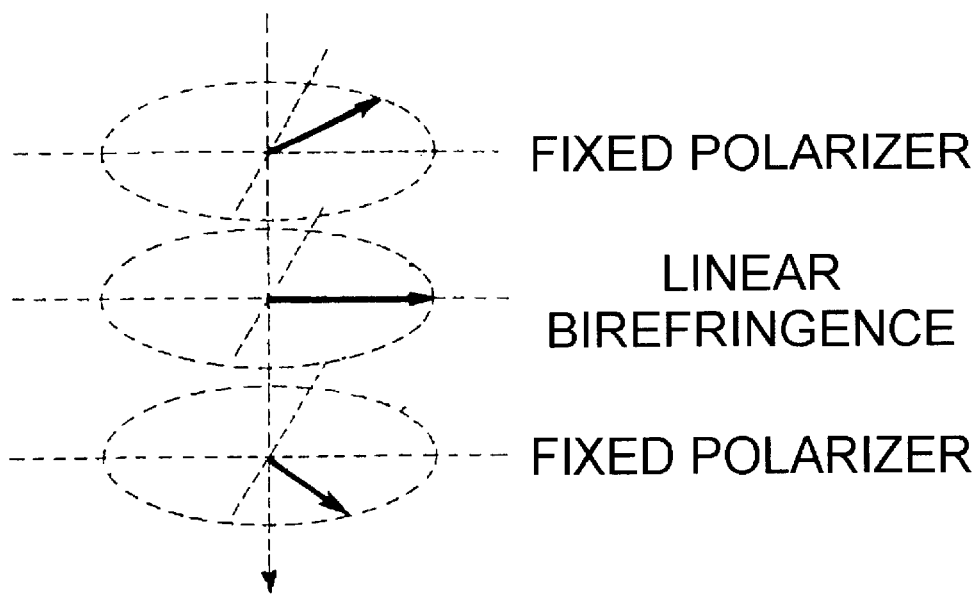
FIG. 1 is a schematic view illustrating an ideal apparatus that can enable linear birefringence variation.
Figure 2:
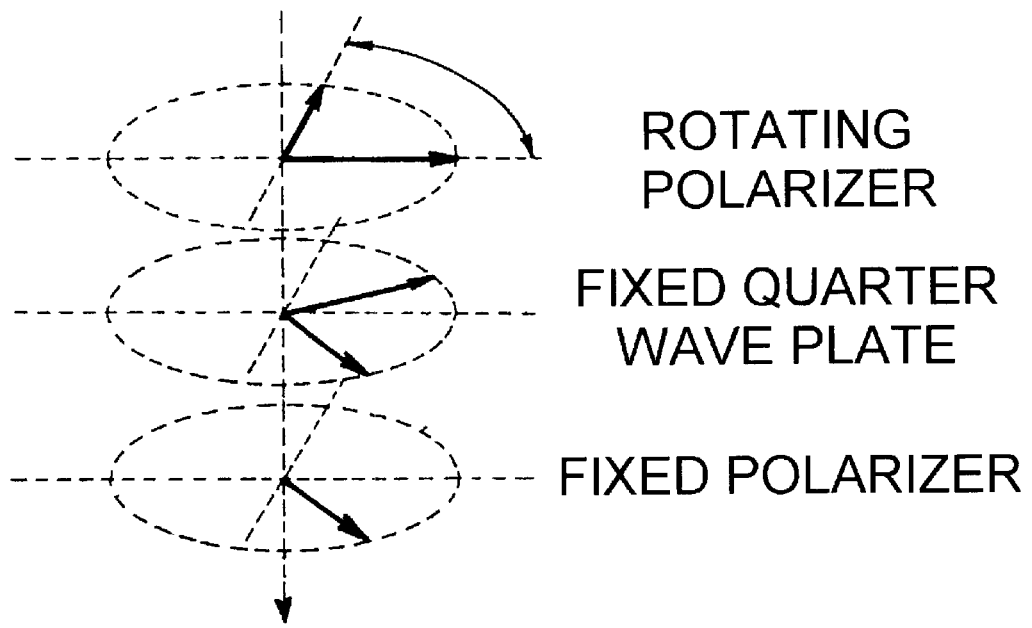
FIG. 2 is a schematic view illustrating an actual apparatus that can enable linear birefringence variation according to the present invention.
Figure 3:
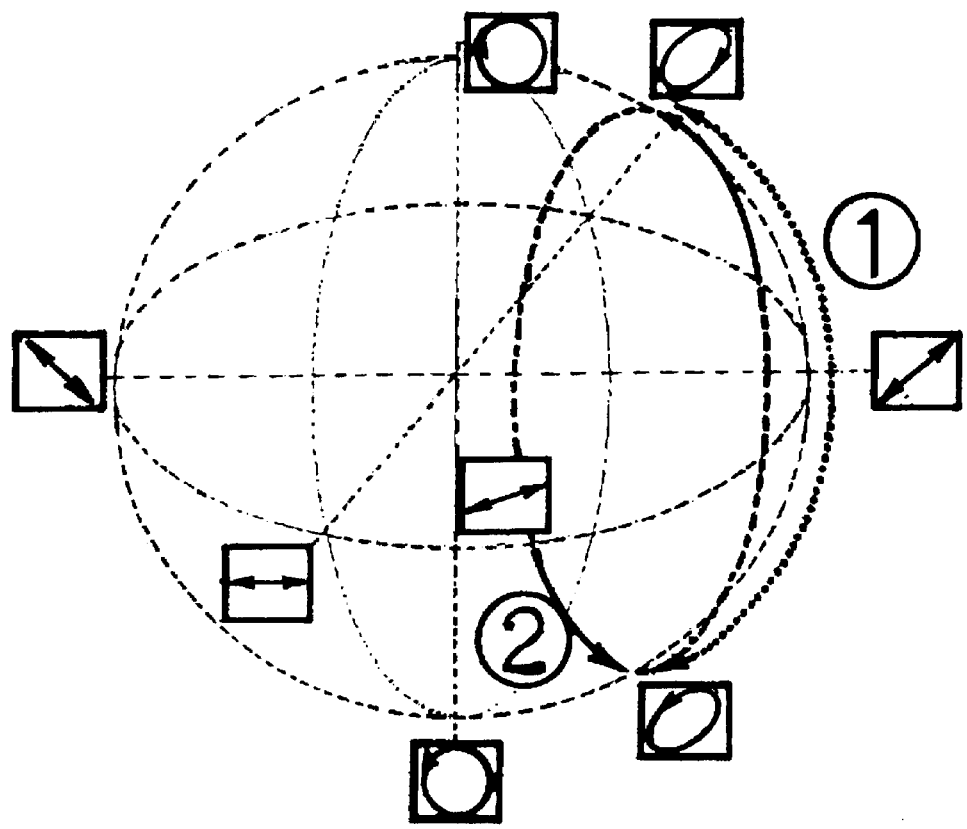
FIG. 3 is a diagram illustrating a difference between traces in which the polarization state of input light is changed by the apparatuses shown in FIGS. 1 and 2, through a Poincare Sphere.

FIG. 1 is a schematic view illustrating an ideal apparatus that can enable linear birefringence variation, FIG. 2 is a schematic view illustrating an actual apparatus that can enable linear birefringence variation according to the present invention, and FIG. 3 is a diagram illustrating a difference between traces in which the polarization state of input light is changed by the apparatuses shown in FIGS. 1 and 2, through a Poincare Sphere.

The ideal apparatus shown in FIG. 1 maintains the polarization state of a light source at 45° against an axis of an optical fiber using a fixed polarizer and then performs birefringence of the same. Also, examples of the apparatus shown in FIG. 1 that can be linearly controlled include a Babinet compensator and a Berek compensator.

When beams that enable polarization conversion pass through the optical fiber, the polarization state is obtained by adding the phase difference of a birefringent device to the phase difference by the optical fiber. Then, the intensity of light is determined using a second fixed polarizer orthogonal to a first fixed polarizer Resultant variation traces of the polarization state move to a bottom portion of a sphere through a trace 1 shown in the bottom of FIG. 3 and have an elliptic polarization state as shown in FIG. 3.

The actual apparatus shown in FIG. 2 shows a structure of an apparatus that can make the same polarization state as that of the ideal apparatus of FIG. 1. First, in a Point sphere, another trace 2 (shown in FIG. 3) can be found in the same manner as the trace 1 that can form the elliptic polarization state. This trace 2 can be implemented by a quarter wave plate. After passing through the quarter wave plate, the polarization state is maintained at a first starting point state of the trace 2. That is, an angle of a first rotating polarizer is adjusted to its starting point. Then, if the quarter wave plate is located at an angle of 45° against the optical fiber axis, the polarization state is maintained at a rotation state corresponding to quarter of a circle in the same path as the trace 2. It is noted that the resultant polarization state is the same as the polarization state in the trace 1. Accordingly, if the optical fiber is located next to the quarter wave plate to transmit light, the intensity of light is determined by a fixed polarizer. Then, the apparatus shown in FIG. 2 has the same result as that of the ideal apparatus shown in FIG. 1.

To find the polarization angle of the rotating polarizer that makes the minimum intensity of detected light, the rotating polarizer is linearly rotated so that the intensity of light is stored in a PC. Respective variation curves for a radius of the resultant optical fiber are obtained to approximate to a secondary curve, so that a minimum value is obtained. In this case, supposing that the phase is $\delta_1(y)=2\theta(y)$, the phase difference induced by the residual stress is $\delta_0(y)$, and the phase difference due to external tension of the optical fiber is $W(y)\epsilon_1$, the following equation (1) can be obtained:

$$W(y)\epsilon_1 + \delta_0(y) + \delta_1(y) = 0 \tag{1}$$

wherein, $\epsilon_1$, is a strain due to tension of the optical fiber, and $W(y)$ is a function of the dopant distribution and a sectional shape of the optical fiber and is a birefringence value due to photoelastic effect accumulated by transmittance of beams. Accordingly, when no external tension of the optical fiber occurs ($\epsilon_1=0$), a value of $\delta_1(y)$ is obtained using the above measuring method. As a result, the distribution of the residual stress of the optical fiber can be obtained by Abel's conversion:

$$\sigma(r) = \frac{-\lambda}{2\pi^2 C_0} \int_r^c \frac{d\,\delta_0(y)/dy}{\sqrt{y^2 - r^2}}\,dy \tag{2}$$

2. Distribution Measurement of Photoelastic Effect

Specific doping materials have the same distribution of the photoelastic effect due to variation of a glass structure by a material doped within the optical fiber and coupling energy. Generally, the degree of the photoelastic effect has been predicted quantitatively by measuring photoelastic coefficients of doped bulk glass. As a result of measuring the photoelastic coefficients, it has been noted that high variation occurs in case where B, Al, or alkali based material is used as a doping material. In the present invention, there is provided a method in which the variation distribution of the photoelastic effect can be measured when such a specific doping material is added. Two examples that show the variation distribution of the photoelastic effect are as follows.

The first example is a static effect corresponding to a case when the optical fiber is tensed. The tensed optical fiber reduces a refractive index in a radial direction of the optical fiber. This reduced refractive index affects light guided within the optical fiber. If the photoelastic effect has the distribution within the optical fiber, different refractive index distributions occur in the tensed optical fiber. For this reason, relative variation occurs in the original refractive index distribution of the optical fiber.

The second example can be described by characteristic of an acoustic wave. The acoustic wave is related to density of glass and photoelastic coefficients. It is important to understand characteristic of the acoustic wave in view of Brillouin scattering or Acousto-optic Tunable Filter (AOTF). Also, this is an essential factor for exactly measuring residual stress and exactly measuring variation in the refractive index by stress.

In the present invention, as a measuring apparatus of residual stress, there is provided a method in which the effect described in the first example can be obtained by measuring the birefringence distribution of the tensed optical fiber. That is to say, if the birefringence distribution of the tensed optical fiber is found, the phase distribution can be represented similarly to the following equation (3):

$$W(y)\epsilon_2 + \delta_0(y) + \delta_2(y) = 0 \tag{3}$$

wherein, $\epsilon_2$ represents tension strain when the optical fiber is tensed, $\delta_2(y)$ is obtained by a polarization angle having the minimum intensity of light output from the tensed optical fiber. $W(y)$ can be obtained by the equations (1) and (3). This distribution can be converted to a polar coordinate using Abel's conversion. The result is as follows:

$$C(r)E(r) = \frac{-\lambda}{2\pi^2} \int_r^c \frac{d\,W(y)/dy}{\sqrt{y^2 - r^2}}\,dy \tag{4}$$

wherein, $C(r)$ represents photoelastic coefficient of glass, $E(r)$ represents Young's modulus, C represents an outer diameter, r represents a radius coordinate of the optical fiber, and y represents the distance from the center of the optical fiber of light that passes through the optical fiber.

Figure 4:
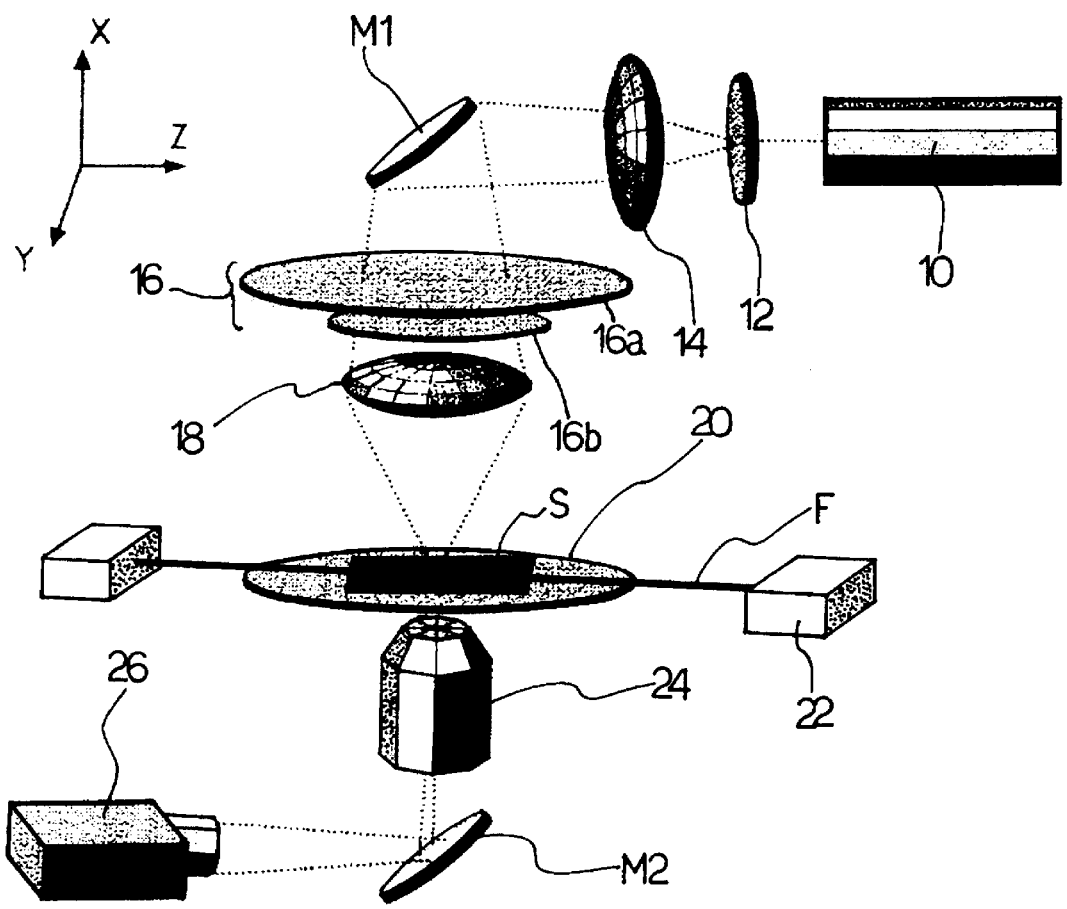
FIG. 4 is a schematic view illustrating an apparatus for measuring residual stress and photoelastic effect according to the preferred embodiment of the present invention.

3. Structure of a Measuring Apparatus According to the Embodiment of the Present Invention As shown in FIG. 4, the measuring apparatus according to the present invention includes a light source 10, a rotating diffuser 12, a collecting lens 14, a first mirror M1, a linear birefringence device 16, a condenser 18, a fiber elongation device 22 for providing tension to the optical fiber F, a fixed polarizer 20, an objective lens 24, a second mirror M2, and a CCD camera array 26. A HeNe laser or Ar-ion laser is used as the light source 10.

Light emitted from the light source 10 having random polarization is completely scattered through the rotating diffuser 12 and then diffused. At this time, the HeNe laser 10 is used as a light source of a short wave length because it has a long life and a narrow spectrum. The HeNe laser 10 is also used because unique phase difference values can be obtained when light of such a short wave length passes through the optical fiber F.

The rotating diffuser 12 is used because it can restrain or remove various diffraction patterns caused by spatial coherence of the light source 10 shown in an image of the optical fiber F. The rotating diffuser 12 is mounted to rotate at high speed. By rotating the rotating diffuser 12 at high speed of approximately 1000 rpm or greater, a spatially averaged uniform image can be obtained. After the scattered light is aligned through the collecting lens 14, the polarization state of beams to be entered on the optical fiber F is controlled using the linear birefringence device 16. The condenser 18 includes a rotating polarizer 16a and a quarter wave plate 16b. The light that passed through the condenser 18 is condensed on a place where the optical fiber is located. At this time, the optical fiber F is inserted into a place between a microscope slide glass cover S and a fixed polarizer 20, where materials having similar refractive indexes such as a refractive index matching gel or glycerin are filled therein. Since the optical fiber F can adhere the fixed polarizer 20 to the optical fiber F to the highest degree, the polarization error can be reduced. The distance between the optical fiber F and the objective lens 24 becomes narrow so that a magnified image can be obtained. Also, the optical fiber F serves to solve technical problems in detecting variation in a length direction of the optical fiber F and a three-dimensional distribution of the section. Furthermore, the optical fiber F can be measured even in a state that it is tensed because it is coupled to the fiber elongation device 22.

Subsequently, the light that passed through the optical fiber F has the intensity distribution of light against an axis Y through the fixed polarizer 20. The light is line-scanned by a frame grabber (not shown) that captures an image of theoptical fiber F in the CCD camera array 26 through the objective lens 24. Then, the light is stored relative to the polarization angle of the rotating polarizer 16a in a computer. At this time, the distance between the optical fiber F and the objective lens 24 is controlled so that the magnifying power is about 100. The light may have different values depending on a diameter coordinate of the optical fiber F. Accordingly, by measuring and calculating light transmittance modulation relative to the diameter coordinate, the residual stress of the optical fiber and the photoelastic effect can be measured. Also, in case where various line scan data are obtained in a length direction of the optical fiber F, the distribution of the optical fiber grating in a length direction can be measured. Further, the sectional structure of a polarization maintenance (PM) optical fiber can be detected by measuring the phase distribution depending on rotation angles based on the axis of the optical fiber F.

Consequently, in the present invention, to improve the manufacturing technology of an optical fiber having high quality and develop a special optical fiber, the residual stress distribution of the optical fiber F and the photoelastic effect can accurately and three-dimensionally dimensionally be measured using the CCD camera array 26 in a length direction against a side vertical to the axis of the optical fiber F. Moreover, in the present invention, a HeNe laser or Ar-ion laser having a narrow line width has been used. Also, in the present invention, the linear birefringence device 16 of input beams for measuring the birefringence distribution, the fiber elongation device 22 for measuring the photoelastic effect distribution, and the frame grabber and the CCD camera array 26 for analyzing images and quickly and exactly collecting data have been used.

In the present invention, instead of rotating the existing polarizer to measure the phase difference, the birefringence distribution of the optical fiber can be detected through fitting by varying the polarization state of input beams using the linear birefringence device 16. Also, the distribution of the photoelastic effect according to tension of the optical fiber can be detected. Accordingly, the apparatus of the present invention provides a simple structure at low cost. Since no polarization devices that can distort the image of the optical fiber exist between the CCD camera array and the polarizer, the apparatus of the present invention has the same condition as a general microscope in obtaining high resolution and three-dimensional high magnifying power. This is only an advantage that cannot be obtained by other measuring apparatuses for residual stress.

Meanwhile, in the present invention, a laser having random polarization may be used as a light source that can be used as a linear birefringence converter. Also, a laser having plane polarization and a quarter wave plate can be used. Thus, the polarization state of light to be entered on the linear birefringence converter becomes a round polarization.

Moreover, the laser having plane polarization and a variable wave plate may be used as the apparatus of the present invention. Thus, the polarization state of light to be entered on the linear birefringence converter is maintained at round polarization.

Furthermore, as another example that can constitute the linear birefringence converter, the quarter wave plate is only rotated so that the phase value can be calculated using $\sin^2\theta(y)$ fitting. Other wave plates or Faraday rotator may be used to control the polarization state of input beams.

Consequently, the apparatus of the present invention could numerically obtain the residual stress $\sigma(r)$ and the photoelastic effect $C(r)E(r)$ using the equations (2) and (4) with the obtained values $W(y)$ and $\delta_0(y)$.

Additionally, in the present invention, when the CCD camera array is used, a CCD cover glass is removed so that interference between the sensor array and the cover glass is removed.

As described above, although the methods for measuring residual stress of the optical fiber based on the related art measuring methods have been in several papers, they have poor accuracy and are not proper to commercialization. However, the measuring apparatus of the present invention enables an optical fiber having high quality and low loss to be manufactured.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for measuring residual stress and photoelastic effect of an optical fiber comprising:

a rotating light diffuser for providing temporally averaged uniform image by restraining spatial coherence of a light emitted from a light source to be completely scattered;

a collecting lens for aligning the light that passes through the rotating light diffuser onto a length of an optical fiber;

a linear birefringence device for linearly controlling a polarization state of the aligned light received from the collecting lens;

a condenser for condensing the light that passes through the linear birefringence device onto a surface where the optical fiber is arranged;

a fixed polarizer for transforming the polarization state of the light which passed through the optical fiber at an intensity distribution of the light emitted from the optical fiber;

an objective lens for obtaining a magnified optical fiber image having the intensity distribution of the light transmitted by the optical fiber; and a unit for measuring a variation in transmittance of the optical fiber at a plurality of locations along the optical fiber by measuring the variation in transmittance of the magnified optical fiber image.

2. The apparatus of claim 1, wherein the light source comprises one of a HeNe laser and an Ar-ion laser.

3. The apparatus of claim 1, wherein the linear birefringence device includes a rotating polarizer and a wave plate spaced apart from the rotating polarizer.

4. The apparatus of claim 3, wherein the wave plate is a quarter wave plate.

5. The apparatus of claim 1, further comprising a microscope slide glass cover for adhering the optical fiber to the fixed polarizer.

6. The apparatus of claim 1, further comprising a mirror M1 between the collecting lens and the birefringence device.

7. The apparatus of claim 1, further comprising a mirror M2 between the objective lens and the unit for measuring a variation in transmittance at a plurality locations along the optical fiber.

8. The apparatus of claim 1, further comprising fiber elongation means for tensioning the optical fiber.

9. The apparatus according to claim 8, wherein said means for tensioning provides a predetermined amount of tension to the optical fiber, and further comprising means for obtaining a phase difference $W(y)$ by an exact tension for a value y given by the following equation and phase difference $\delta_0(y)$ induced by a residual stress using the collected transmittance variance data of a $\sin 2\theta(y)$ type and the measured tension, $$W(y)\epsilon_1 + \delta_0(y) + \delta_1(y) = 0$$

wherein, $\epsilon_1$ represents strain due to tension of the optical fiber, $\delta_0(y)$ represents the phase difference induced by the residual stress, and W(y) represents the phase difference due to external tension of the optical fiber.

10. The apparatus of claim 1, wherein the rotating light diffuser is rotated at 1000 rpm or greater.

11. An apparatus for measuring residual stress and photoelastic effect of an optical fiber comprising:

a light source;

means for rotational diffusing of light from said light source, said light being scattered in a temporally averaged uniform image;

aligning means for aligning a direction of the scattered light output from said means for rotational diffusing so that the scattered light is input to said aligning means output as aligned light;

controlling means for controlling a polarization state of the aligned light output from said aligning means;

condensing means for condensing the light output from said controlling means onto a longitudinal section of an optical fiber;

means for fixing the polarization state of the light output from the longitudinal section of the optical fiber at an intensity distribution;

an objective lens for obtaining a magnified optical fiber image having the intensity distribution of the light transmitted from the longitudinal section of the optical fiber; and a unit for measuring a variation in transmittance of the magnified optical image of the optical fiber at a plurality of locations along the optical fiber.

12. The apparatus according to claim 11, wherein said controlling means comprises includes a rotating polarizer and a wave plate spaced apart from the rotating polarizer.

13. The apparatus of claim 11, wherein the wave plate is a quarter wave plate.

14. A method for measuring residual stress of optical fiber and photoelastic effect, the method comprising the steps of:

performing linear birefringence on the polarization state of beams entered on the optical fiber using a liner birefringence device which includes a rotating polarizer and a quarter wave plate;

collecting transmittance variance data of beams detected by a CCD camera array while tensing the optical fiber using the fiber elongation device; and obtaining phase a difference W(y) by exact tension for a value y given by the following equation and phase difference $67_0(y)$ induced by the residual stress using the collected transmittance variance data of a sin 2θ(y) type and the measured tension, $$W(y)\epsilon_1 + \delta_0(y) + \delta_1(y) = 0$$

wherein, $\epsilon_1$ represents strain due to tension of the optical fiber, $\delta_0(y)$ represents the phase difference induced by the residual stress, and W(y) represents the phase difference due to external tension of the optical fiber.

15. The method of claim 14, wherein the residual stress σ(r) and the photoelastic effect C(r)E(r) are numerically obtained using Abel's conversion of the following equations with the phase difference by the obtained phase difference W(y) and the phase difference induced by the residual stress $\delta_0(y)$, $$\sigma(r) = \frac{-\lambda}{2\pi^2 C_0} \int_r^c \frac{d\,\delta_0(y)|dy}{\sqrt{y^2 - r^2}} dy; \text{ and}$$

$$C(r)E(r) = \frac{-\lambda}{2\pi^2} \int_r^c \frac{d\,W(y)|dy}{\sqrt{y^2 - r^2}} dy$$

wherein, σ(r) represents the residual stress, C(r) represents photoelastic coefficient of glass, E(r) represents Young's modulus, C represents an outer diameter, r represents a radius coordinate of the optical fiber, and y represents the distance of light that passes through the optical fiber, from the center of the optical fiber.

16. A method for measuring residual stress of optical fiber and a photoelastic effect, said method comprising the steps of:

(a) providing a light source;

(b) rotationally diffusing light from said light source, so that said light is scattered in a temporally averaged uniform image;

(c) aligning a direction of the scattered light after the rotational diffusing in step (b) so that the scattered light is output as aligned light;

(d) polarizing the aligned light in step (c);

(e) condensing the light output in step (c) onto a longitudinal section of an optical fiber;

(f) fixing the polarization of the light output from the longitudinal section of the optical fiber at an intensity distribution;

(g) obtaining a magnified optical fiber image having the intensity distribution of the light transmitted from the longitudinal section of the optical fiber; and (h) measuring a variation in transmittance of the magnified optical image of the optical fiber at a plurality of locations along the optical fiber.

17. The method according to claim 16, further comprising tensioning the optical fiber to a predetermined amount of tension.

18. The method according to claim 17, further comprising the steps of:

(i) obtaining a phase difference W(y) of the optical fiber at the predetermined amount of tension for a value y given by the following equation and phase difference $\delta_0(y)$ induced by the residual stress using the collected transmittance variance data of a sin 2θ(y) type and the measured tension, $$W(y)\epsilon_1 + \delta_0(y) + \delta_1(y) = 0$$

wherein, $\delta_1$ represents strain due to tension of the optical fiber, $\epsilon_0(y)$ represents the phase difference induced by the residual stress, and W(y) represents the phase difference due to external tension of the optical fiber.

19. The method according to claim 18, wherein the residual stress σ(r) and the photoelastic effect C(r)E(r) are numerically obtained using Abel's conversion of the following equations with the phase difference by the obtained phase difference W(y) and the phase difference induced by the residual stress $\delta_0(y)$, $$\sigma(r) = \frac{-\lambda}{2\pi^2 C_0} \int_r^c \frac{d\,\delta_0(y)|dy}{\sqrt{y^2 - r^2}} dy; \text{ and}$$

-continued $$C(r)E(r) = \frac{-\lambda}{2\pi^2} \int_r^c \frac{d\ W(y)|dy}{\sqrt{y^2 - r^2}} dy$$

wherein, σ(r) represents the residual stress, C(r) represents photoelastic coefficient of glass, E(r) represents Young's modulus, C represents an outer diameter, r represents a radius coordinate of the optical fiber, and y represents the distance of light that passes through the optical fiber from the center of the optical fiber.

20. The method according to claim 16, wherein the light source provided in step (a) is comprises one of a HeNe laser and an Ar-ion laser.

21. The method according to claim 16, wherein the polarizing in step (d) is performed by a linear birefringence device.

22. The method according to claim 21, wherein the linear birefringence device includes a rotating polarizer and a wave plate.

23. The method according to claim 22, wherein the waveplate is a quarter wave plate.

24. The method according to claim 21, further comprising providing a first mirror for reflecting the aligned light in step (c) to the linear birefringence device for polarizing in step (d).

25. The method according to claim 14 wherein the magnified optical fiber image in step (g) is obtained by an objective lens, the variation in transmittance is measured by a charge coupled device (CCD) camera array, and further comprises providing a second mirror for reflecting the magnified optical fiber image to the CCD camera array.

* * * * *